United States Patent [19]

Sakuma et al.

[11] Patent Number: 4,854,169
[45] Date of Patent: Aug. 8, 1989

[54] ACCELEROMETER

[75] Inventors: Kazuhiro Sakuma; Hirohito Itoh; Mitsuaki Kazou; Kenji Kuramoto, all of Akishima, Japan

[73] Assignee: Japan Aviation Electronics Industry Ltd., Tokyo, Japan

[21] Appl. No.: 201,080

[22] Filed: Jun. 1, 1988

[30] Foreign Application Priority Data

Jun. 15, 1987 [JP] Japan .................. 62-146950
Jul. 6, 1987 [JP] Japan .................. 62-166883
Jul. 6, 1987 [JP] Japan .................. 62-166884

[51] Int. Cl.$^4$ .................. G01P 15/00; G01P 1/02
[52] U.S. Cl. .................. 73/517 B; 73/431; 73/866.5; 248/901
[58] Field of Search .................. 73/517 B, 493, 497, 73/431, 866.5; 248/DIG. 1

[56] References Cited

U.S. PATENT DOCUMENTS

| | | | |
|---|---|---|---|
| 3,441,754 | 4/1969 | Heny | 310/334 |
| 3,702,073 | 11/1972 | Jacobs | 73/517 B |
| 4,555,944 | 12/1985 | Hanson et al. | 73/517 B |
| 4,555,945 | 12/1985 | Hanson et al. | 73/517 B |
| 4,592,234 | 6/1986 | Norling | 73/517 B |
| 4,697,455 | 10/1987 | Norling | 73/517 B |
| 4,726,228 | 2/1988 | Norling | 73/517 B |

Primary Examiner—Stewart J. Levy
Assistant Examiner—Laurence G. Fess
Attorney, Agent, or Firm—Bierman and Muserlian

[57] ABSTRACT

An accelerometer is composed of a pair of housings each of which forms a magnetic structure together with a permanent magnet and a flapper flexurally supported by hinge portions between the magnetic structures. The permanent magnet is secured to the housing of the magnetic structure by means of a spacer so as to prevent a harmful thermal stress which will be caused by the difference of thermal expansion between the magnet and the housing. A bobbin with a torquer coil is secured to the flapper by means of a base member to take no effect of thermal stress which will be caused by the difference between the materials of the bobbin and the flapper. The above elements are housed in a case which is installed in an instrument board so as to be unaffected by changes in temperature in surroundings of the accelerometer.

9 Claims, 3 Drawing Sheets

ACCELEROMETER

FIELD OF THE INVENTION

This invention relates to an accelerometer, and more particularly to a capacitive accelerometer comprising a pair of magnetic structures, a movable flexure means mounted between the magnetic structures and a housing for enclosing these elements.

BACKGROUND OF THE INVENTION

The accelerometer which is secured to an object whose acceleration is to be detected or measured comprises a pair of magnetic structures each of which has a permanent magnet and a flapper that is flexurally mounted between the magnetic structures, torquer coils being mounted on opposite surfaces of the flapper respectively so as to surround each permanent magnet in each of the magnetic structures, and a case or housing for installing these elements. As the object on which the accelerometer is mounted is accelerated, the flapper tends to remain stationary in space, thus moving relative to the magnetic structures. Two capacitors are formed on each side of the flapper and, as the flapper moves relative to the magnetic structures, the capacitance of one of the capacitors increases and the capacitance of the other capacitor decreases. These capacitors are employed in connection with a balance circuit to produce a DC current which is proportional to the acceleration and is fed back to the coils of the accelerometer to restore the flapper. The DC current proportional to the acceleration is measured.

In order to satisfy severe requirements for operation of the accelerometer and the latest improved technique in this field, the accelerometer must be constructed to minimize effects of temperature changes over wide range in surroundings.

According to changes of temperature in surroundings of the accelerometer, thermal stress will be caused between each of the constitutional elements of the accelerometer which are different from one another in thermal expansion, and the thermal stress will act on the operation of the accelerometer considerably.

In the first place, the magnetic structure of the accelerometer includes a housing and a permanent magnet. The housing may be made of materials which are low in coefficient of thermal expansion such as for example Invar steel, but the permanent magnet cannot be made of material having the same or similar coefficient of thermal expansion as that of the housing. Consequently, the thermal stress produced in the magnetic structure decreases in thermal stability of the accelerometer.

Moreover, thermal stress which acts on the flapper and bobbins to be mounted on the opposite surfaces of the flapper will have a harmful effect on measurement of the accelerometer.

In general, an assembly which is constructed from the magnetic structures and the flapper has been mounted in a cylindrical case with a flange so as to leave an annular clearance or gap between the inner wall of the case and the outer wall of the assembly. The case is inserted into an opening in an instrument board or panel so as to support it by flange of the case.

When the accelerometer mounted on the object in the manner mentioned above is, however, subjected to temperature change in the surroundings, thermal stress will act on the case and the assembly depending upon the difference of coefficient of thermal expansion between the two. Thus, several elements composing the assembly of accelerometer are affected by the thermal stress to cause error in measurement.

OBJECTS OF THE INVENTION

In the light of the foregoing, it is a main object of the present invention to provide an accelerometer which is stable to temperature change.

It is a further object of the present invention to provide an accelerometer which is so constructed to avoid action of thermal stress at the connecting portions of the permanent magnet and the housing.

It is a still further object of the present invention to provide an accelerometer which can prevent an error in measurement owing to thermal stress acting on the flapper and a coil supporting means to be mounted on the flapper.

It is another object of the present invention to provide an accelerometer which can be mounted on an instrument board or panel so as to avoid errors in the measurement of the accelerometer owing to thermal stress acting on between the assembly of the magnetic structures and the flapper and an instrument board or panel.

BRIEF DESCRIPTION OF THE DRAWINGS

These and other objects of the present invention will become apparent from the following description taken in connection with the accompanying drawings, in which.

DETAILED DESCRIPTION OF THE INVENTION

Figure 1:
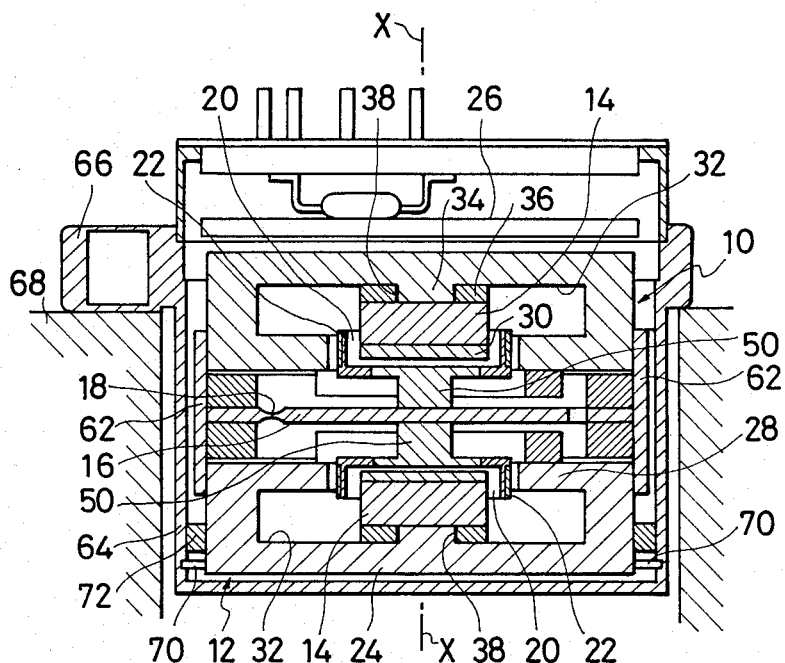
FIG. 1 is a vertical sectional view of an embodiment of the accelerometer according to the present invention.

As shown in FIG. 1, according to the present invention, an accelerometer includes a pair of magnetic structures 10 and 12. To each of the magnetic structures 10 and 12 a permanent magnet 14 is secured and between the magnetic structures 10 and 12 a movable flapper 16 is flexibly mounted by hinge portions 18. Two bobbins 20 on each of which a torquer coil 22 is wound are securely fastened to the upper and lower surfaces of the flapper 16.

The upper and lower magnetic structures 10 and 12 are of similar construction and operate in a similar manner. The magnetic structure 10 or 12 is a cylindrical body with respect to the central axis X—X, and formed in one piece of a hollow housing 24 having a flat end wall 26 and an annular and inwardly directed flange 28 at the bottom thereof. One of the end surfaces of the disk-like permanent magnet 14 is secured to the inner end surface of the hollow housing 24 of each of the magnetic structures 10 and 12. A pole piece 30 is secured to other end surface of the magnet 14.

In a usual magnetic structure of the accelerometer, the inner end surface of the cylindrical housing is in the form of plane or flat and the disk-like permanent magnet 14 is directly secured to the inner flat surface of the end wall, but, according to the present invention, as shown in a first embodiment illustrated in FIG. 1, there is provided a disk-like protrusion 34 at a central portion of the inner end surface 32. The diameter of the protrusion 34 is smaller than that of the disk-like permanent magnet 14. A ring like spacer 36 is put on the protrusion 34, and is made of magnetic material such as soft magnetic iron which is similar to or lower than that of the permanent magnet in coefficient of thermal expansion. The lower end surface of the spacer 36 is secured to the permanent magnet 14 by suitable means such as adhesive. The inner side wall of the opening in the spacer 36 and the outer peripheral wall of the protrusion 34 are referred to as cylindrical contact surfaces 38 and these surfaces 38 are secured to each other by suitable means such as a laser welding and the like. The central portion of the permanent magnet 14 other than that which is secured to the ring like spacer remains free from the surface of the protrusion 34. Thus, the permanent magnet 14 is secured to the housing 24 of the magnetic structure 10 or 12 through the cylindrical contact surfaces 38.

Figure 2:
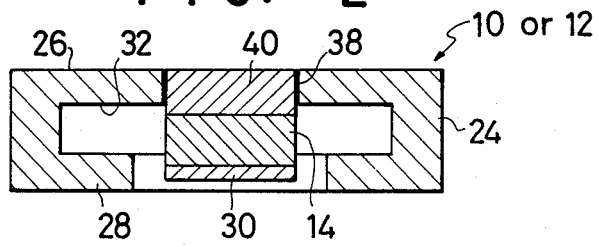
FIG. 2 is a schematic sectional elevation of a modified form of the magnetic structure according to the present invention.

FIG. 2 shows a modification of the magnetic structures 10 or 12 illustrated in FIG. 1, at a central portion of the inner end surface 32 of the housing 24, there is provided a round opening so as to insert a disk-like spacer 40. The outer cylindrical surface of the spacer 40 and the inner cylindrical wall or surface of the opening in the housing 24 are also referred to as cylindrical contact surfaces 38 and secured to each other by means of a laser welding. The permanent magnet 14 is secured to the spacer 40 by means of suitable means such as adhesive.

Figure 3:
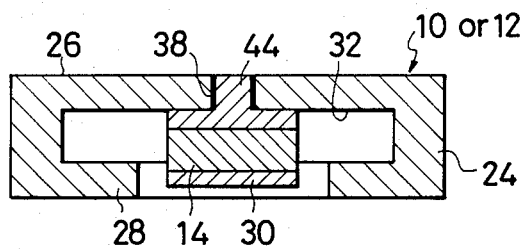
FIG. 3 is a schematic sectional elevation of another modification of the magnetic structure according to the present invention.

FIG. 3 illustrates another modification of the magnetic structure 10 or 12, in which the diameter of the central opening in the inner end surface 32 of the housing 24 is smaller than that of the permanent magnet 14. A spacer 44 is provided with a post which can be inserted into the central opening in the housing 24 and the permanent magnet 14 is secured to the spacer 44. In this structure, the outer peripheral wall of the post of the spacer 44 and the inner peripheral wall of the opening in the housing 24 are also referred to as cylindrical contact surfaces 38 and can be secured to each other by means of a laser welding.

As set forth in the above embodiments, although the material of the permanent magnet 14 is different from the material of the housing 24 of the magnetic structure 10 or 12 in coefficient of thermal expansion, the permanent magnet 14 is secured to the housing 24 through the spacer 36, 40 or 44 of soft magnetic iron which is the same as or similar to the material of the permanent magnet 14 in thermal expansion. The spacer 36, 40 or 44 is secured to the housing 24 of the magnetic structure 10 or 12 at the cylindrical contacting surfaces 38. The permanent magnet 14 itself is difficult to process or machine, but the spacer 36, 40 or 44 of soft magnetic iron can easily be machined or processed.

Consequently, the material of the permanent magnet 14 is considerably different from the material of the housing 24 in coefficient of thermal expansion, but the thermal stress acting on the contact portion of the permanent magnet 14 with the spacer 36, 40 or 44 can be ignored, because the permanent magnet 14 is the same as or similar to the spacer in coefficient of thermal expansion. The effect of thermal stress which will act on the spacer 36, 40 or 44 and the housing 24 through the cylindrical contact surfaces 38 is minimized and the adhesive applied to these surfaces will not be cracked or fissured.

Usually the flapper is made of metal, an elastic conductor, fused quartz or high elasticity non-magnetic metal. Two bobbins are securely fastened to the upper and lower surfaces of the flapper respectively and torquer coils are wound on bobbins. The bobbin is made of aluminum which is non-magnetic material, small in specific gravity and can easily be insulated. If any other members or elements which are different from the flapper in thermal expansion are connected or jointed to the flapper, the accelerometer leads to noticeable error in measurement according to thermal stress acting upon the members and the flapper.

Figure 4:
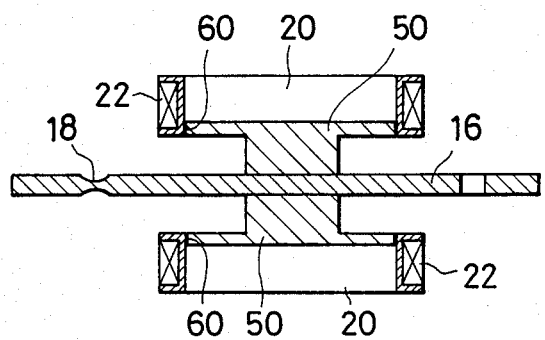
FIG. 4 is a sectional elevation of an embodiment of the flapper according to the present invention.
Figure 7:
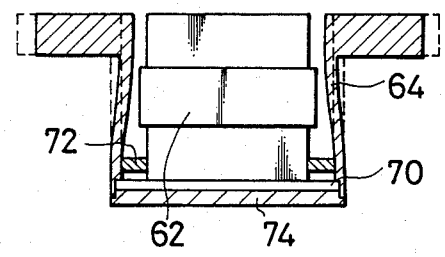
FIGS. 7, 8 and 10 are respectively schematic sectional elevations of assistance in explaining the action of thermal stress on the accelerometer according to the present invention.

According to the present invention, however, the bobbin 20 may be formed in a hollow cylindrical body (FIG. 4) or a cup shape with a round opening in a bottom (FIG. 7).

Figure 5:
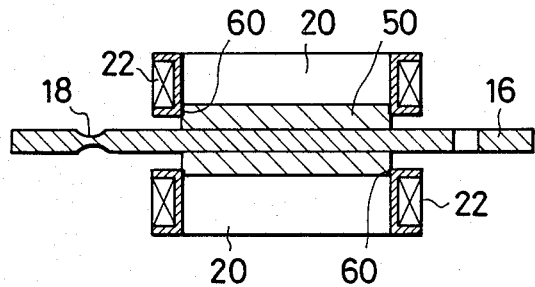
FIG. 5 is a sectional elevation of a modified embodiment of the flapper according to the present invention.
Figure 6:
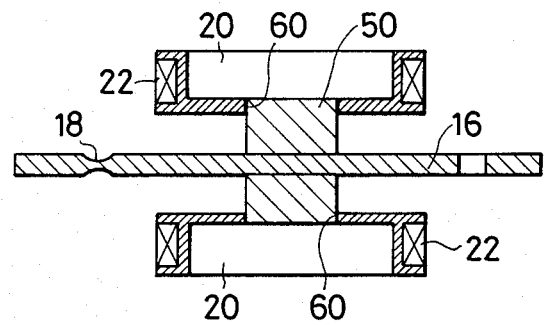
FIG. 6 is a schematic sectional elevation of a modification of the flapper according to the present invention.

The cylindrical bobbin 20 can be secured to the surface of the flapper 16 by means of a base member 50. The cross sectional area of the base member 50 may be made in T-shaped configuration (FIG. 4), or in the form of disk (FIGS. 5 and 6).

The base member 50 is of the same material as the flapper 16 and they are cemented or secured to each other with a suitable adhesive or made into one body, if desired.

According to the present invention, the bobbin 20 of the coil 22 and the base member 50 to which the flapper 16 is secured are connected to each other by cylindrical surfaces 60 and the base member 50 is made of the same material as the flapper 16, and therefore the thermal stress acting upon the flapper 16 and the bobbin 20 owing to temperature change is absorbed in the base member 50. Consequently, the accelerometer of the present invention is independent of temperature.

The upper and lower magnetic structures 10 and 12 and the flapper 16 are coupled each other by means of a band-like ring member 62 so as to form an assembly. This assembly is mounted or installed in a hollow cylindrical case or housing 64 which is provided with a flange 66 at the upper end thereof and the case 64 is mounted in an opening in an instrument board or panel 68.

The diameter of the inner peripheral wall of the cylindrical case 64 is larger than the diameter of the outer peripheral wall of the assembly so that the assembly can be installed in the case 64 with a gap between them.

Figure 8:
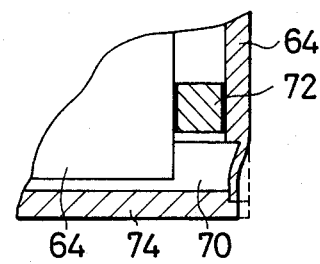

In the embodiments shown in FIGS. 1, 7 and 8, at the lower portion of the inner peripheral wall of the case 64 there is provided with an annular groove 70 and a ring 72 is mounted on the upper portion of the groove 70 so as to bridge across the gap between the assembly and the case 64. Thus the assembly can be supported at its lower portion and the upper portion of the assembly can be freed from the case 64. The inner and outer side walls of the ring 72 can be adhered or secured to the outer side wall of the lower magnetic structure 12 and the inner side wall of the case 64, respectively.

A base plate or bottom 74 of the case 64 can be secured to the case after the groove 70 has been machined or formed in the inner end of the case 64, if desired.

As is evident from the foregoing, the ring 72 for securing the assembly of the upper and lower magnetic structures 10 and 12 to the case 64 is spaced apart from the flange 66 which serves to mount the case 64 on the instrument board 68, and thermal stress which would be caused between the instrument board 68 and the flange 66 will not directly be acted on the assembly so that, as shown in FIG. 7, the stress will be absorbed into the side wall of the case 64. Moreover, as shown in FIG. 8, the groove 70 which is formed at the lower inner wall of the case 64 serves to absorb thermal stress into it to prevent the deformation of the case 64.

Figure 9:
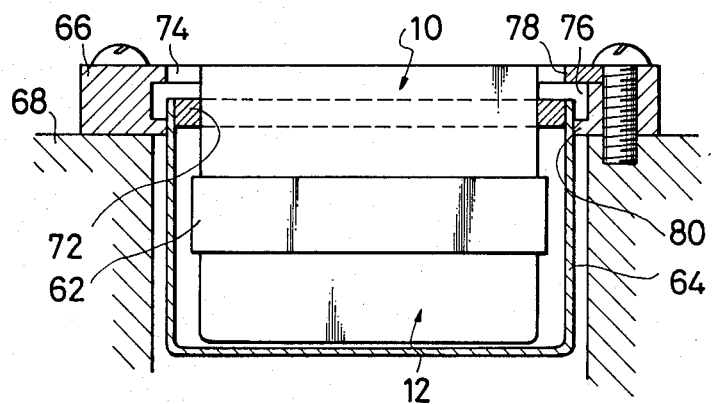
FIG. 9 is a schematic sectional elevation of an embodiment of a mounting means of an accelerometer according to the present invention.

As shown in FIG. 9, a flange 66 for securing the case 64 to the instrument board 68 may be formed separately from the cylindrical case 64 and is provided with a circular opening 74 to as insert the case 64 therein. In the inner side wall of the opening 70 in the flange 66, there is provided a groove 76 with an upper edge 78 and a lower edge 80.

The ring 72 may be mounted on the uppermost end of the assembly of the magnetic structures 10 and 12 to support the assembly within the case 64 and the case 64 is inserted into the opening in the instrument board 68 so as to put the upper end of the case 64 in a space of the groove 76 in the flange 66. The inner wall of the lower edge 80 of the groove 76 in the flange 66 can be secured to the case 64 by means of suitable way for example a laser welding or adhesive.

Figure 10:
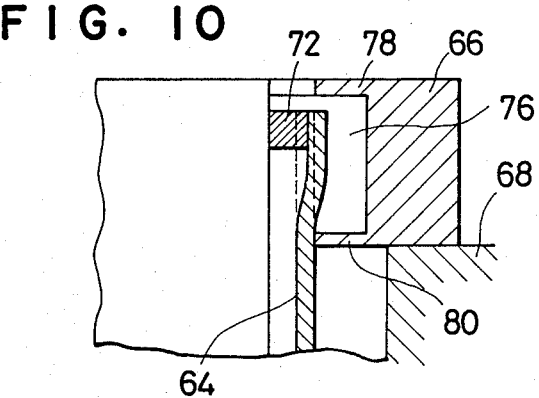

According to the embodiment shown in FIG. 9, the assembly of the magnetic structures 10 and 12 can be supported by the ring 72 so as to suspend it in the case 64 and the case 64 is also supported by the lower edge 80 of the groove 76 in the flange 66 into the opening in the instrument board or panel 68. Consequently, even if thermal stress produced in the instrument board is transferred to the case 60 through the lower edge 80 of the groove 76, the upper portion of the case 64 is deformed at a space between the upper and lower edges 78 and 80 of the groove 76, as shown in FIG. 10 and the stress will not be transmitted to essential elements or portions in the assembly of the magnetic structures 10 and 12.

While the invention has been described in its preferred embodiments, it is to be understood the modifications will occur to those skilled in the art without departing from the true scope and spirit of the invention.

What is claimed is:

1. An accelerometer for detecting the acceleration of an object to which it is attached, comprising
    a pair of magnetic structures each of which includes a disk-like permanent magnet and a housing for containing said permanent magnet therein;
    a flapper flexurally mounted between said magnetic structures;
    two bobbins mounted on the upper and lower surfaces of said flapper;
    a torquer coil wound on each of said bobbins;
    said disk-like permanent magnet being mounted on said housing through a spacer made of a magnetic material having a similar coefficient of thermal expansion to that of said permanent magnet;
    said spacer being secured to said housing at a cylindrical contact surface formed in said spacer;
    said bobbin being secured to the surfaces of said flapper through a disk-like base member made of a material having the same coefficient of thermal expansion as the material of said flapper;
    a disk-like protrusion formed at a central portion of the inner end wall of said housing;
    said spacer being in the form of an annular configuration having an opening for inserting said protrusion; and
    the outer peripheral wall of said protrusion and the peripheral wall of said opening in said spacer are secured to each other.

2. An accelerometer as claimed in claim 1 in which said bobbin and said disk-like base member are secured to each other at the cylindrical contact surfaces formed in said bobbin and said base member.

3. An accelerometer as claimed in claim 1 in which said bobbin is in the form of a hollow cylindrical body and an area of vertical section of said base member has the form of T-shape configuration, and said bobbin and base member are secured to each other at the contact surfaces of the inner wall of said hollow cylindrical body and outer side wall of said base member.

4. An accelerometer for detecting the acceleration of an object to which it is attached, comprising
    a pair of magnetic structures each of which includes a disk-like permanent magnet and a housing for containing said permanent magnet therein;
    a flapper flexurally mounted between said magnetic structures;
    two bobbins mounted on the upper and lower surfaces of said flapper;
    a torquer coil wound on each of said bobbins;
    said disk-like permanent magnet being mounted on said housing through a spacer made of a magnetic material having a similar coefficient of thermal expansion to that of said permanet magnet;
    said spacer being secured to said housing at a cylindrical contact surface formed in said spacer;
    said bobbin being secured to the surface of said flapper through a disk-like base member made of a material having the same coefficient of thermal expansion as the material of said flapper;
    a circular opening provided at a central portion of the inner end wall of said housing;
    said spacer is in the form of a disk-like configuration to be inserted into said opening; and
    said housing and said spacer are secured to each other at the contact surfaces of the inner wall of said opening and the outer side wall of said spacer.

5. An accelerometer as claimed in claim 4 in which said spacer is in the form of a disk-like configuration with a post at the center thereof, said post is inserted into said opening in said housing, and said housing and said spacer are secured to each other at the contact surfaces of the inner wall of said opening and the outer side wall of said post.

6. An accelerometer for detecting the acceleration of an object to which it is attached, comprising
    a pair of magnetic structures each of which includes a disk-like permanent magnet and a housing for containing said permanent magnet therein;
    a flapper flexurally mounted between said magnetic structures;
    two bobbins mounted on the upper and lower surfaces of said flapper;
    a torquer coil wound on each of said bobbins;

said disk-like permanent magnet being mounted on said housing through a spacer which is made of a magnetic material having the same coefficient of thermal expansion as said permanent magnet;

said spacer being secured to said housing at a cylindrical contact surface formed in said spacer;

said bobbin being secured to the surface of said flapper through a disk-like base member which is made of a material having the same coefficient of thermal expansion as the material of said flapper;

a band-like coupling member for connecting the two housings with said flapper to form a sensor assembly to sense acceleration;

a hollow cylindrical case with a flange with which said case provided with a groove at a lower inner wall therein is installed to an instrument board for installing said sensor assembly therein; and a ring for securing said sensor assembly to said case.

7. An accelerometer as claimed in claim 6 in which said ring is mounted between the outer wall of said sensor assembly and the inner wall of said case at an upper portion which is adjacent to said groove.

8. An accelerometer as claimed in claim 6 in which said flange is independently formed from said hollow cylindrical case, a groove is formed in an inner wall of said flange, and said case is secured to the lower edge of said groove.

9. An accelerometer as claimed in claim 8 in which said ring is mounted on the uppermost end of said case for securing said case to said sensor assembly, and the uppermost end of said case is positioned in between the upper edge and the lower edge of said groove.

* * * * *